United States Patent [19]

Yamamori et al.

[11] Patent Number: 4,746,938

[45] Date of Patent: May 24, 1988

[54] INK JET RECORDING APPARATUS WITH HEAD WASHING DEVICE

[75] Inventors: Kiyoshi Yamamori, Yokohama; Yuuji Mogi, Sagamihara; Shigeyoshi Hasegawa, Tsukui; Tamotsu Kojima, Sashima; Sadashi Higuchi, Kawasaki, all of Japan

[73] Assignee: Matsushita Electric Industrial Co. Ltd., Osaka, Japan

[21] Appl. No.: 882,511

[22] Filed: Jul. 7, 1986

[30] Foreign Application Priority Data

| | | | |
|---|---|---|---|
| Jul. 11, 1985 | [JP] | Japan | 60-152670 |
| Sep., 1985 | [JP] | Japan | 60-195124 |
| Sep. 4, 1985 | [JP] | Japan | 60-195125 |
| Sep. 4, 1985 | [JP] | Japan | 60-195127 |
| Sep. 4, 1985 | [JP] | Japan | 60-195128 |

[51] Int. Cl.$^4$ .......... G01D 15/18

[52] U.S. Cl. .......... 346/140 R

[58] Field of Search .......... 346/140, 75

[56] References Cited

U.S. PATENT DOCUMENTS

| | | | |
|---|---|---|---|
| 4,106,032 | 8/1978 | Miura | 346/140 |
| 4,144,537 | 3/1979 | Kimura | 346/140 |
| 4,364,065 | 12/1982 | Yamamori | 346/140 |
| 4,369,450 | 1/1983 | Iwagami | 346/140 |
| 4,437,105 | 3/1984 | Mrazek | 346/140 |
| 4,533,927 | 8/1985 | Iwagami | 346/140 |
| 4,540,997 | 9/1985 | Biggs | 346/140 |

*Primary Examiner*—Joseph W. Hartary
*Attorney, Agent, or Firm*—Stevens, Davis, Miller & Mosher

[57] ABSTRACT

An ink jet recording apparatus has an ink jet unit from which tiny independent ink droplets, suspended by a flow of air, are made to fly towards a recording medium, thereby recording information on the medium. The apparatus has a heat washing unit disposed at a position beyond one end of a recording medium mounting portion, so that the ink jet unit which has been moved to this position after completion of the recording operation is washed by the head washing unit which is movable towards and away from the ink jet unit at this position, whereby a high stability and reliability of the ink jet recording are ensured for a long period of time without suffering from clogging of nozzles or contamination of the recording medium. The stability and reliability are further enhanced by the simultaneous use of an ink mist suction unit which sucks ink mist around the ink jet unit and an anti-clogging unit which prevents clogging of the nozzles.

1 Claim, 15 Drawing Sheets

INK JET RECORDING APPARATUS WITH HEAD WASHING DEVICE

BACKGROUND OF THE INVENTION

The present invention relates to an ink jet recording apparatus and, more particularly, to an ink jet recording apparatus equipped with a head washing device and suitable for use in, for example, a peripheral equipment of a computer or a color printer.

An ink jet printing in which air flow joins ink droplets has been known in the art as exemplified by the system shown and described in U.S. Pat. No. 4,106,032. In the system described in this patent, a jet of ink is caused to issue from an ink nozzle of an ink jet head in the form of a succession of tiny individual ink droplets of a varying size depending on the instantaneous value of an input signal which is to be recorded, and carried to a recording medium with air flow from an air nozzle of the ink jet head. The ink nozzle is moved across the surface of the recording medium so that the ink droplets are ejected to desired print positions.

In this system, when the ink jet head upon completion of the printing has reached the final recording point, the nozzle surface of the ink jet head has been contaminated by contaminants such as ink splashed back from the surface of the recording paper and paper dusts.

A cleaning device has been known which is designed to remove these contaminants from the nozzle surface thereby cleaning the nozzle surface, as shown in FIG. 5 attached to the specification of U.S. Pat. No. 4,364,065. This cleaning device has a head cleaner which is adapted to wipe the nozzle surface of the ink jet head when the head is moved to a position beyond one end of the recording drum by the feeding mechanism, thereby scraping off the contaminants from the nozzle surface. The contaminant scraped off from the nozzle surface moves downward by its weight along a gutter formed in the cleaner and is collected in a receptacle.

In this system, the contaminant is heavily accumulated in the cleaner as the recording is conducted frequently, so that the cleaning effect is gradually impaired, although deposition of the contaminant on the nozzle surface is avoided. In fact, it is very difficult to keep clean the nozzle surface with the head cleaner which has been stuffed with the contaminants scraped off from the nozzle surface. In addition, since the nozzle surface is scraped by the head cleaner, there is a risk that the air nozzle is clogged with the contaminant which has been scraped off from the nozzle surface, causing various detrimental effects or troubles.

On the other hand, the specification of U.S. Pat. No. 4,106,032 discloses an ink jet head in which the air pressure applied to the air chamber of the head and the air pressure applied to the ink tank are adjusted so as to maintain a good balance of pressure in the region around the ink nozzle, thereby improving the discharge characteristics of the head. In this type of ink jet head, the desired balance of pressure is maintained on condition that the air is jetted from the air nozzle. Therefore, any blockage of the air nozzle, even when it is a temporary one, impairs the balance of the pressure resulting in various troubles such as introduction of air into the ink chamber of the ink head. For this reason, it has been prohibited to apply the head cleaner to the ink jet head of the kind described. The air nozzle tends to be clogged also with ink adhered to and dried on the head nozzle surface, so as to impair the balance of the pressure resulting in the troubles mentioned above.

SUMMARY OF THE INVENTION

Accordingly, an object of the invention is to provide a reliable ink jet recording apparatus which is capable of overcoming the above-described problems of the prior art.

Another object of the invention is to provide an ink jet recording device which is easy to maintain.

FIG. *6a* is a front elevational view of a head washing device constituting an essential portion of a third embodiment of the ink jet recording device of the invention;

FIGS. *6b* and *6c* are side elevational views of the head washing device shown in FIG. *6a*;

FIG. *6d* is a bottom plan view of the head washing device;

FIG. *7a* is a front elevational view of a head washing device constituting an essential portion of a fourth embodiment of the ink jet recording apparatus of the invention;

FIG. *7b* is a side elevational view of the head washing device in FIG. *7a;*

FIG. *7c* is a bottom plan view of the head washing device shown in FIG. *7a;*

Figure 8:
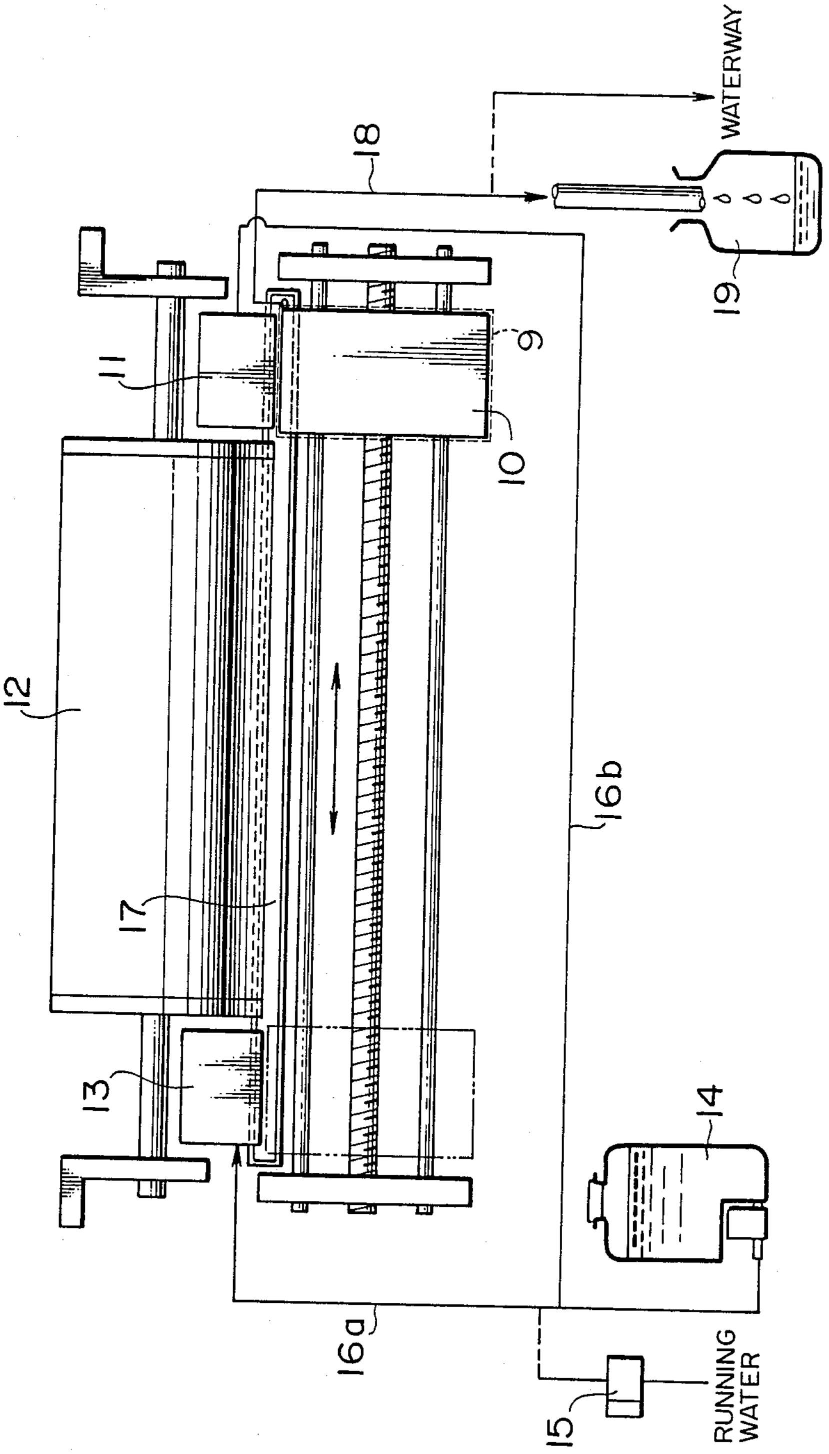
Figure 9:
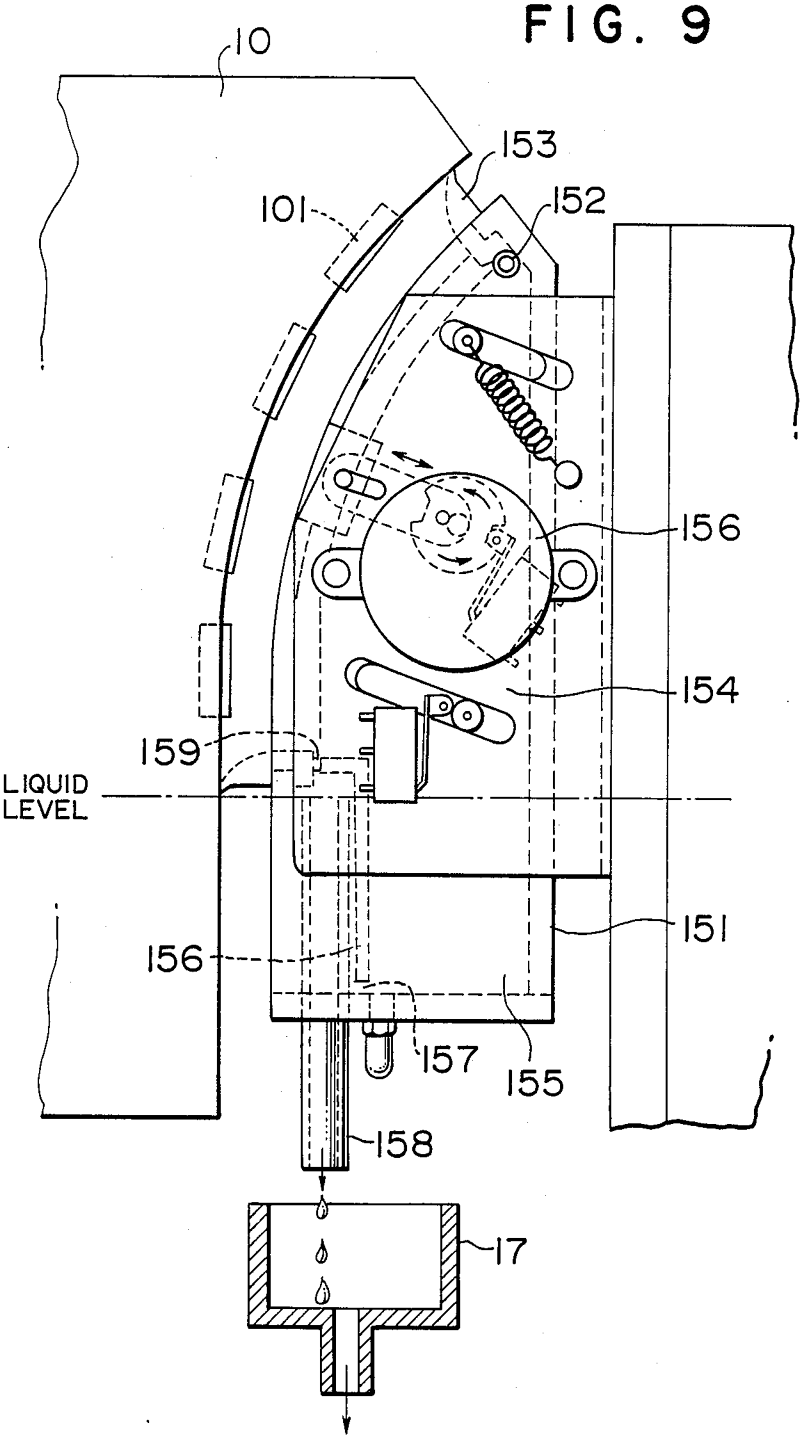
Figure 10:
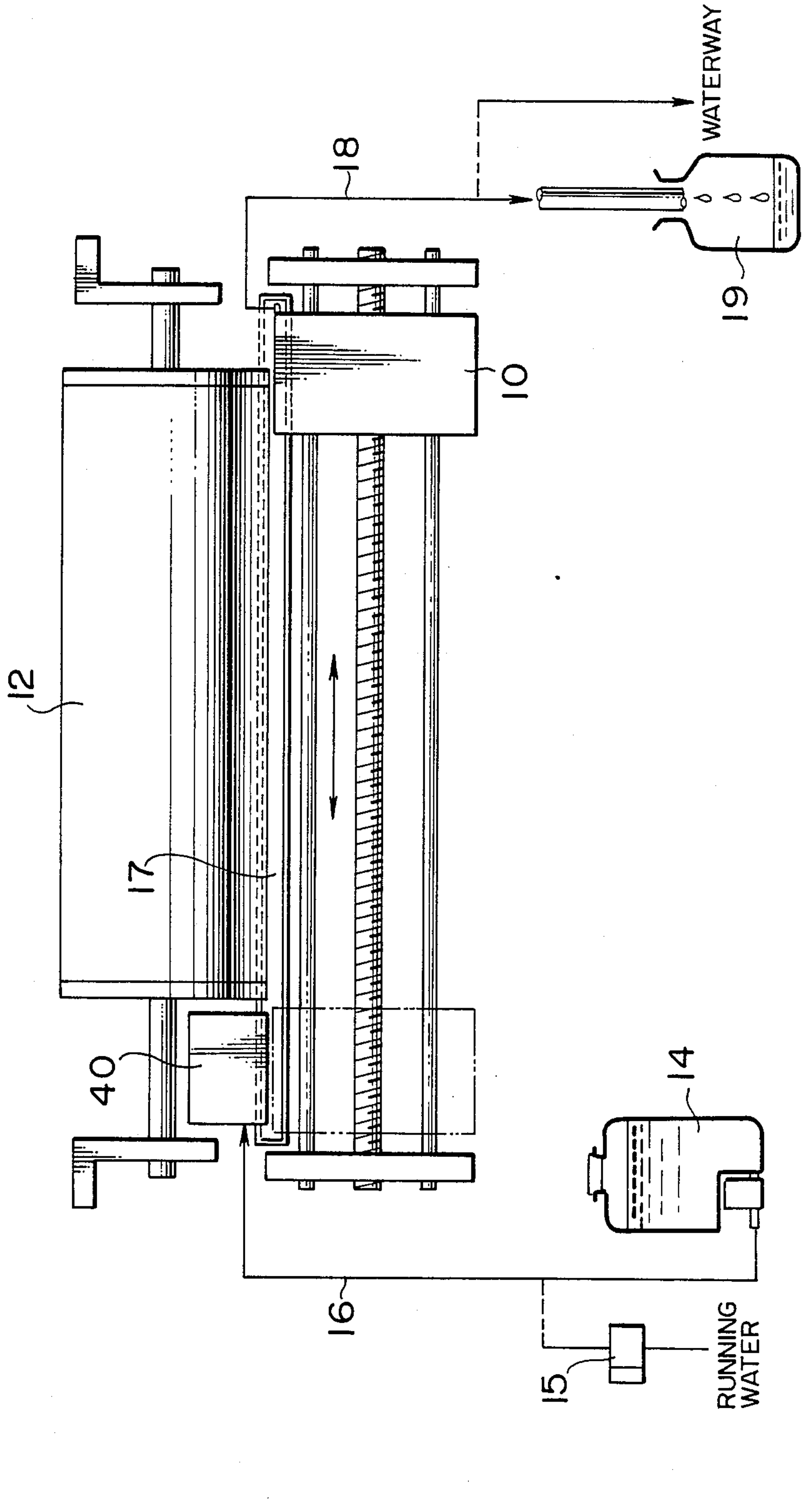
Figure 11:
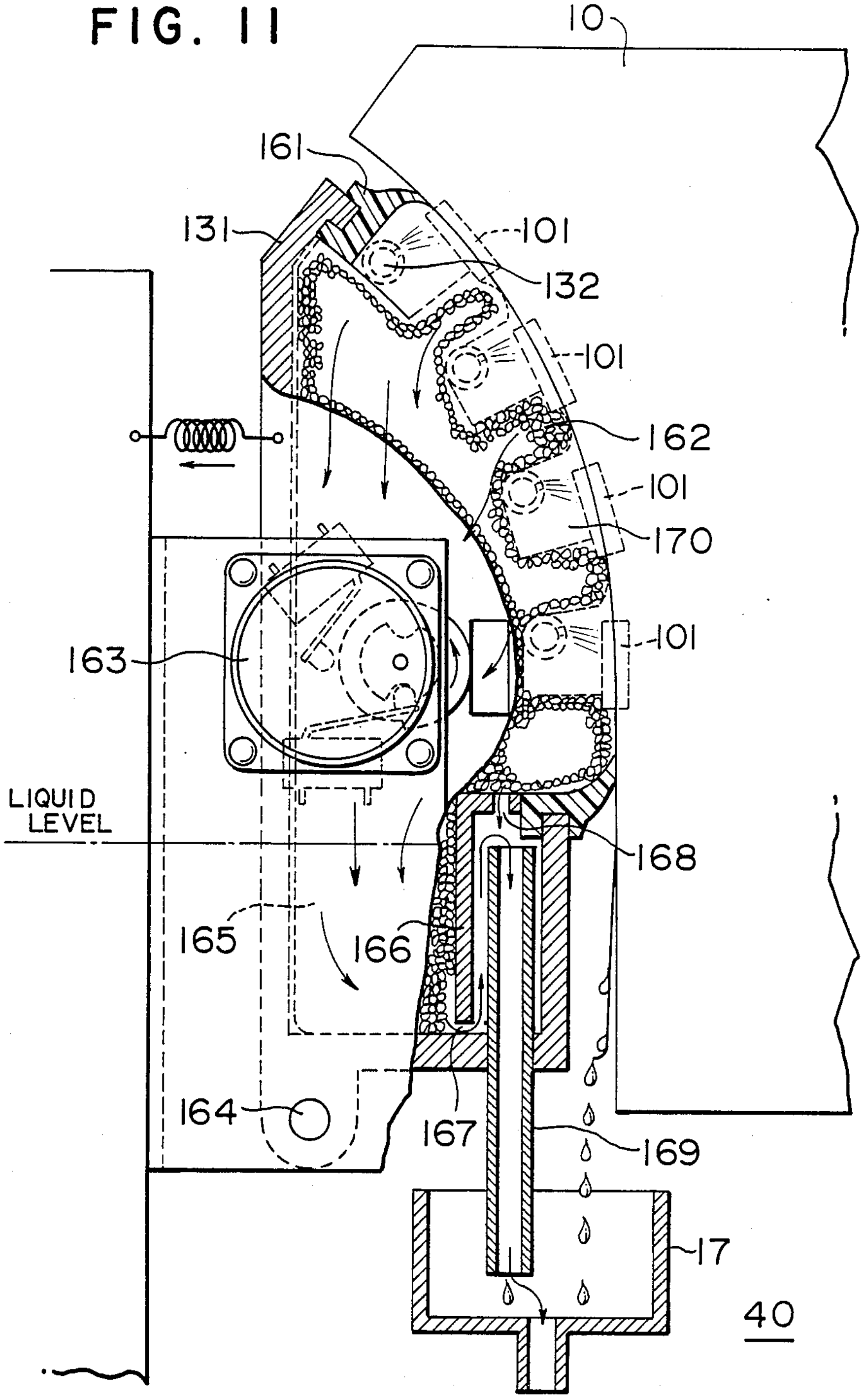

FIG. 8 is a schematic illustration of the concept of an anti-clogging device in a fifth embodiment of the ink jet recording apparatus of the invention;

FIG. 9 is a partly-sectioned side elevational view of the anti-clogging unit in the device shown in FIG. 8;

FIG. 10 is a plan view of an essential portion of a sixth embodiment of the ink jet recording apparatus of the invention; and FIG. 11 is a side elevational view of a head stabilizing unit incorporated in the device shown in FIG. 10.

DESCRIPTION OF THE PREFERRED EMBODIMENTS

Figure 1:
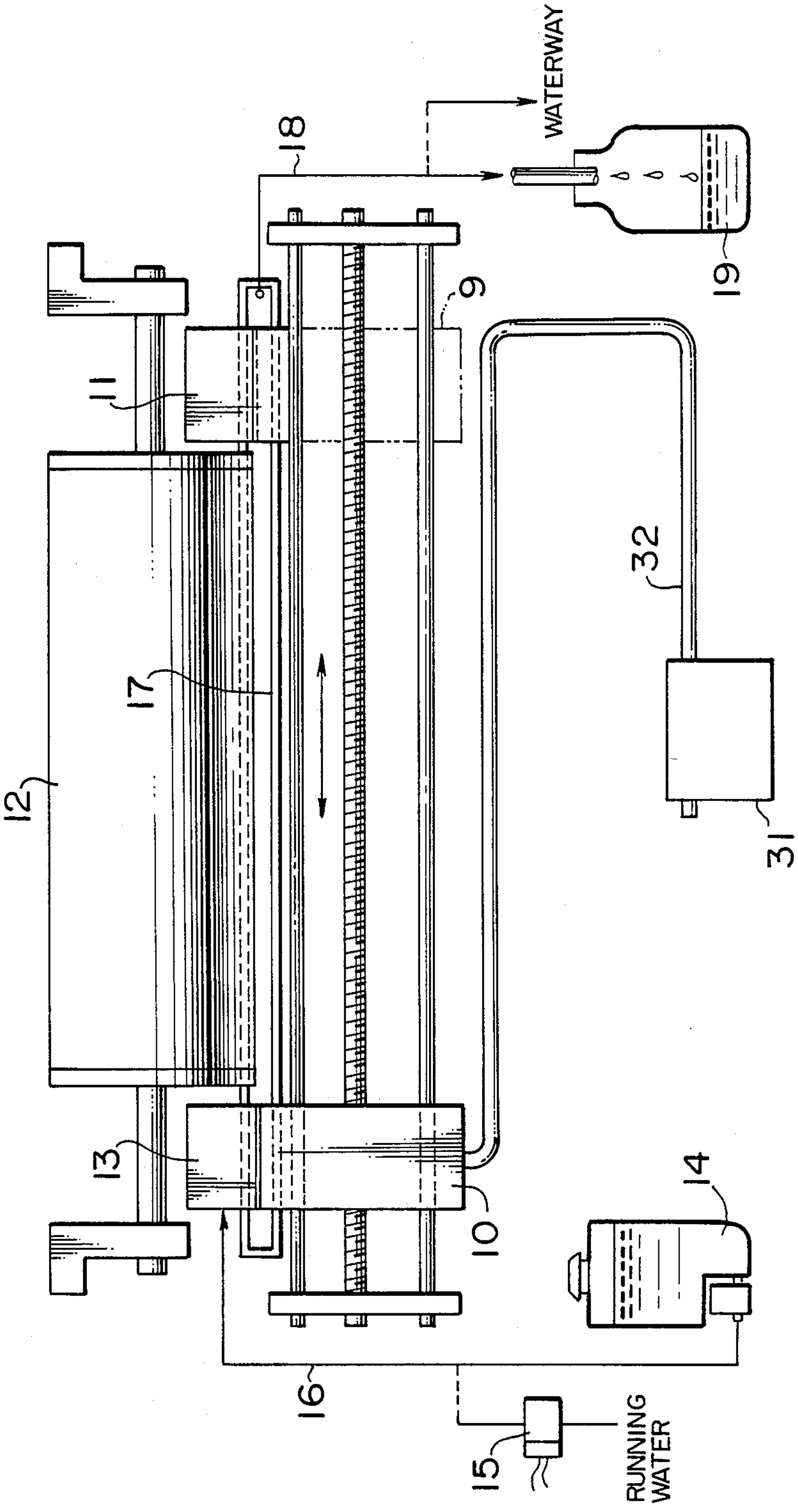
FIG. 1 a schematic illustration of a head cleaning device in an embodiment of an ink jet recording apparatus of the invention.

FIG. 1 shows a head cleaning device incorporated in a first embodiment of the ink jet recording apparatus in accordance with the present invention. As will be seen from this Figure, the first embodiment of the ink jet recording apparatus is constituted by various parts including an ink jet unit 10, an anti-clogging unit 11, a recording drum 12, a washing unit 13, a water supply tank 14, a solenoid valve 15, a water supply pipe 16, a drain receiver 17, a drain pipe 18 and a drain tank 19. Numerals 31 and 32 denote, respectively, an air suction unit and an air suction hose.

Figure 2:
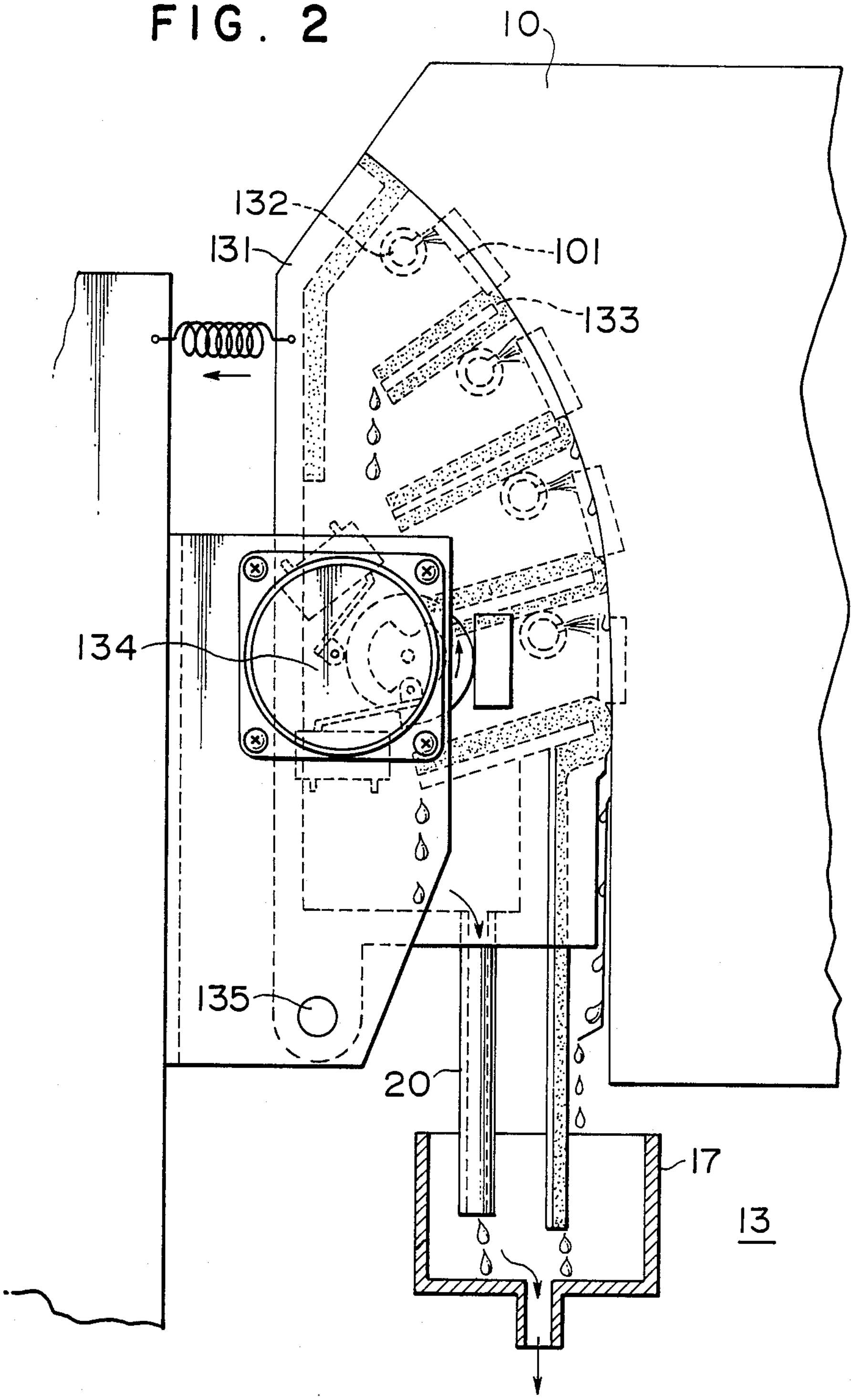
FIG. 2 is a side elevational view of a head washing unit in an embodiment of the invention.

FIG. 2 shows the construction of the washing unit 13. As will be seen from this Figure, the washing unit 13 has an ink jet head 101, a washing housing 131, a washing nozzle 132, a draining member 133, a washing housing driving mechanism 134, and a fulcrum 135 for the operation of the washing housing.

A description will be made hereinunder with reference to the drawings as to the operation of this embodiment.

Referring first to FIG. 1, when the printer is not operating, the ink jet unit 10 is in the home position 9 where the head nozzle is covered by an anti-clogging device 11.

As the electric power is supplied to the printer, the anti-clogging device 11 starts to operate so as to uncover the head. Then, an air supply device which is not shown starts to operate, so that pressurized air is supplied to the ink jet head unit 10 such that a predetermined air pressure is maintained in the ink jet head unit 10. Then, after the recording drum 12 is charged with the recording paper, a print start signal is applied, so that the ink jet unit 10 is moved to the recording start point thereby to start the recording. Upon completion of the printing, the ink jet unit 10 is moved to a position where it faces a head washing unit 13 disposed at a position beyond one end of the recording drum. As the ink jet unit 10 is stopped, the washing housing driving mechanism 134 starts to operate so that the washing housing 131 is pressed onto the ink jet unit 10. Then, after the elapse of several seconds, a pump in the water supply tank 14 operates for a predetermined period of time, so that cleaning water is sprayed onto the head 101 through the water supply pipe 16 and the washing nozzle 132, thereby to wash the contaminant such as deposited ink away from the head nozzle surface and other parts around the head nozzle surface. When the cleaning water is supplied directly from the running or commercial water rather than the water supply tank, a solenoid valve 15 provided at an intermediate portion of the water supply pump is suitably operated to control the supply of the cleaning water.

Most of the cleaning water blown against the head 101 is introduced into the washing housing 131 through a draining member 133 and is collected in the drain receiver 17. Other portion of the cleaning water is introduced into the drain receiver after washing the front side of the ink jet unit 10. Then, the drain 20 of the cleaning water in the drain receiver 17 is collected in a drain tank 19 of the printer through the drain pipe 18, or discharged to a suitable external tank or gutter.

After the washing, the washing housing driving mechanism 134 is started to retract the washing housing 131, so that the ink jet unit 10 is reset to the home position 9.

The draining member 133 is intended for preventing water droplets on the underside of the head nozzle from being transferred to the recording drum 12 or to the recording paper, thereby to eliminate any contamination of the recording paper. To this end, the draining member 133 is preferably constituted by a foamed polymer having continuous pores, fiber mat and a brush-like member.

When the cleaning water is supplied from the water supply tank 14, the cleaning water is preferably supplied with a small quantity of a surface tension reduction agent (surfactant) so that a higher draining effect can be obtained.

As will be understood from the foregoing description, in the described embodiment of the invention, a water-spray type washing unit is disposed at a position beyond one end of the recording medium where the ink jet unit is brought each time the printing is completed. Therefore, the contaminants such as ink deposited on the head nozzle surface are removed by washing which is conducted upon each completion of the printing operation, whereby the stability of the ink jet head is remarkably improved while the clog of the nozzle and the contamination of the recording medium are prevented for a long period of time.

Figure 3:
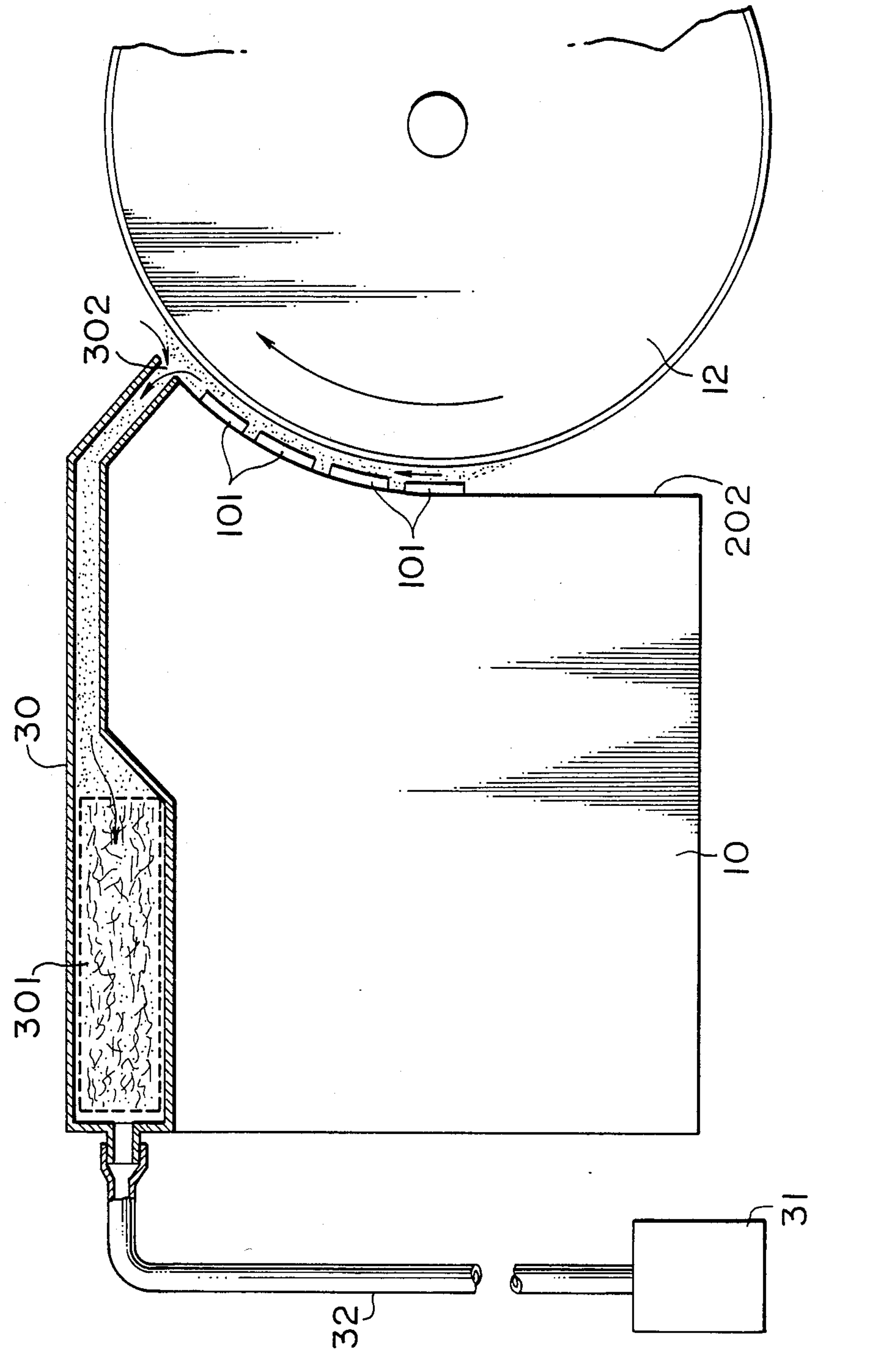
FIG. 3 is a fragmentary sectional view of another embodiment of the invention.

FIG. 3 shows another embodiment of the invention in which the ink jet unit 10 is equipped with an ink mist suction unit 30.

Referring to FIG. 3, a second embodiment of the ink jet recording apparatus of the invention has a drum 12, an ink jet unit 10, an ink jet head 101, an ink mist suction unit 30 provided on the ink jet unit 10, a filter member 301 for absorbing the mist sucked through the mist suction port 302, and an air suction means 31 for applying a suction power through an air suction hose 32.

Figure 4:
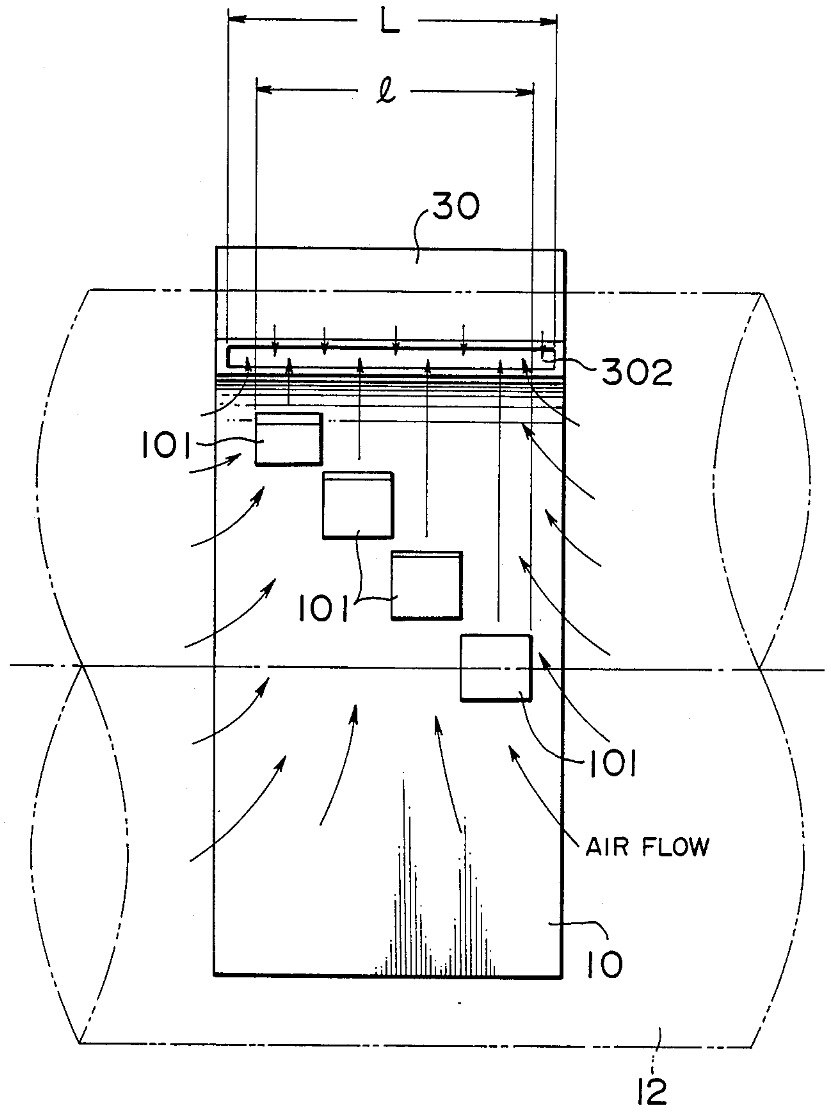
FIG. 4 is a front elevational view of an ink mist sucking unit and an ink jet unit.
Figure 5:
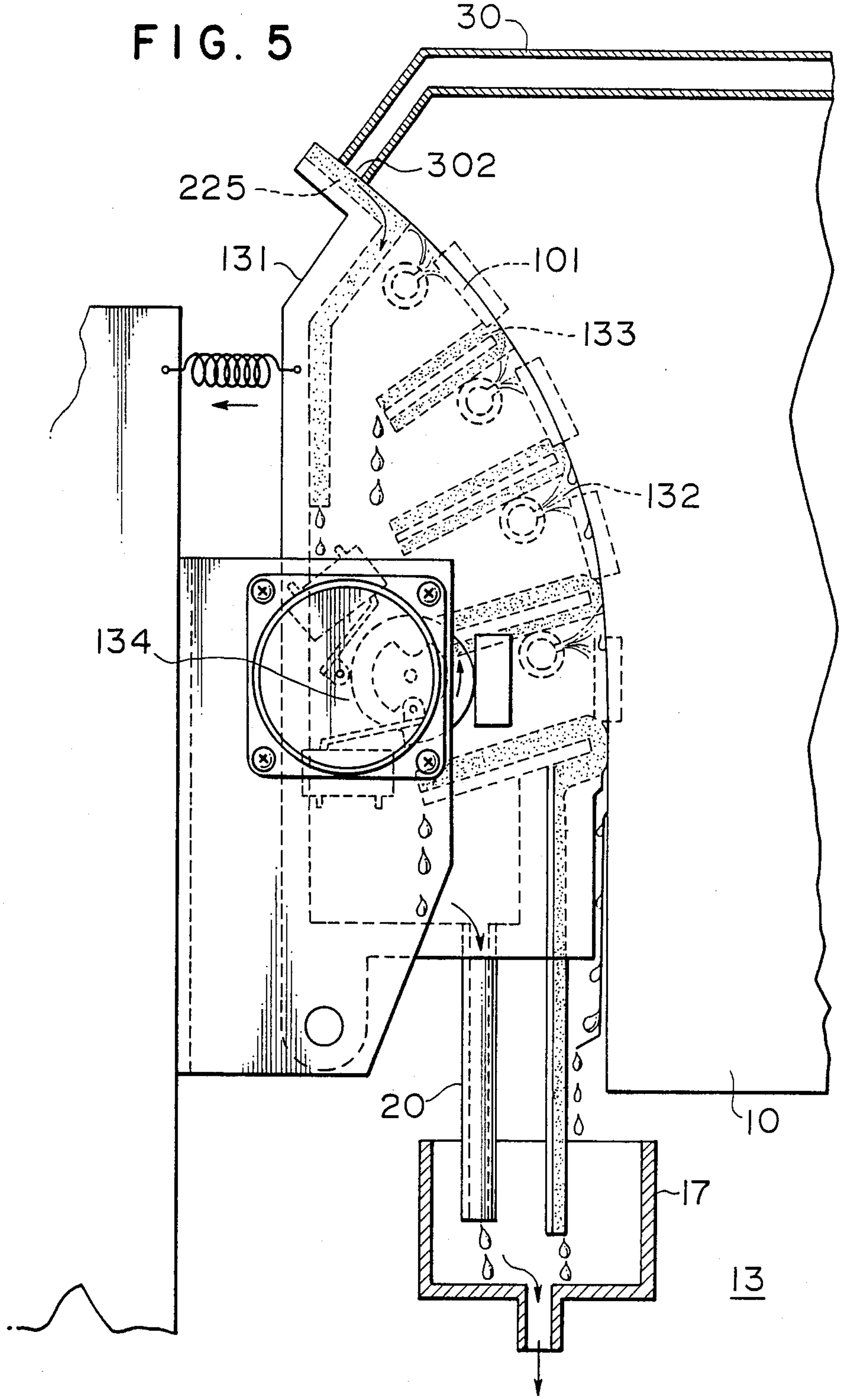
FIG. 5 is a fragmentary sectional view of a head washing unit constituting an essential part of the second embodiment.
Figure 6A:
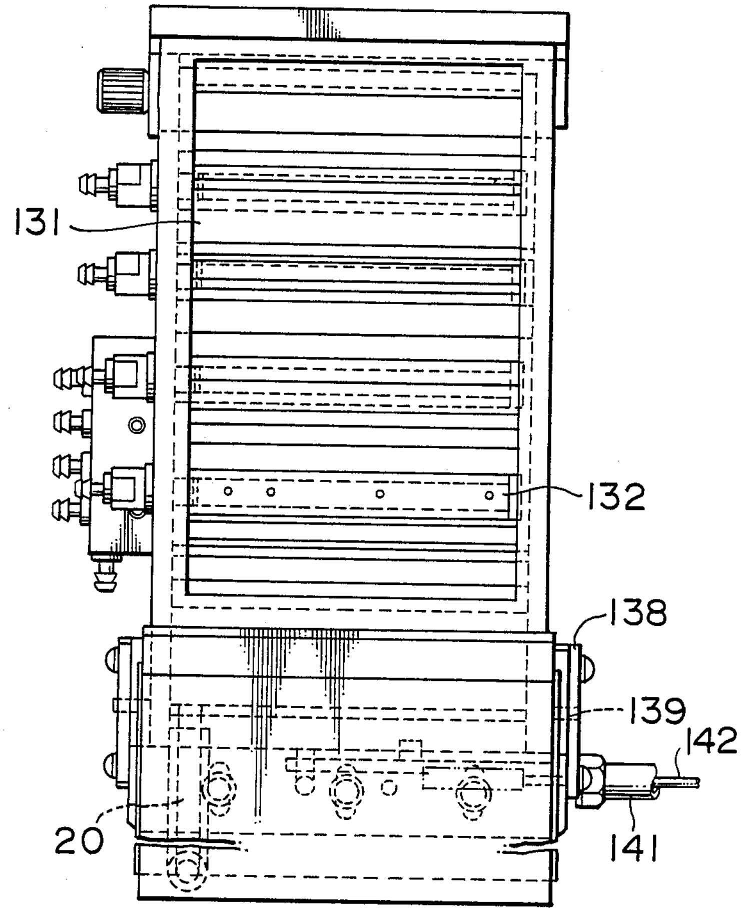
Figure 6B:
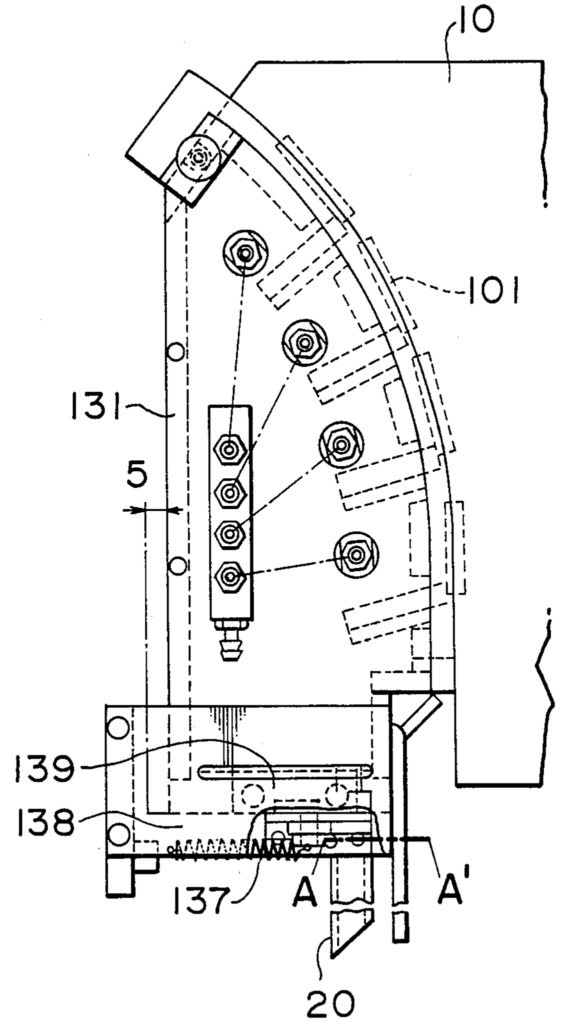
Figure 6C:
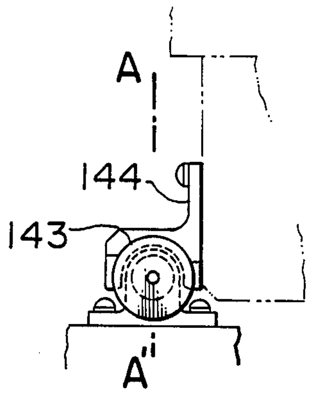
Figure 6D:
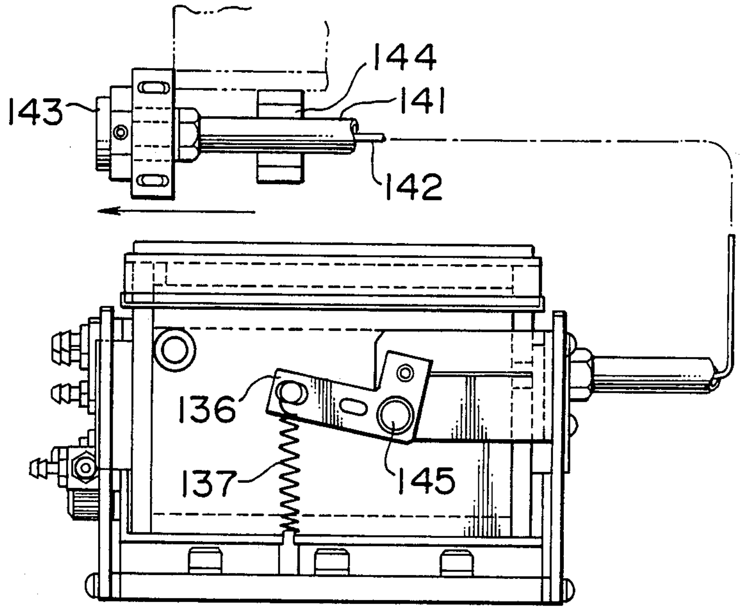
Figure 7A:
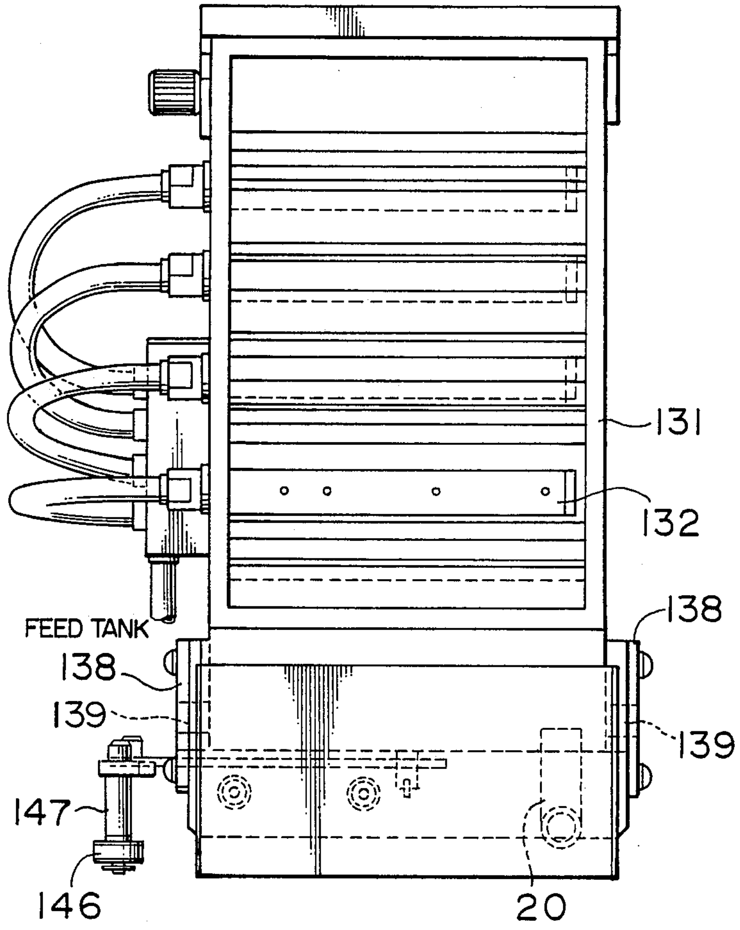
Figure 7B:
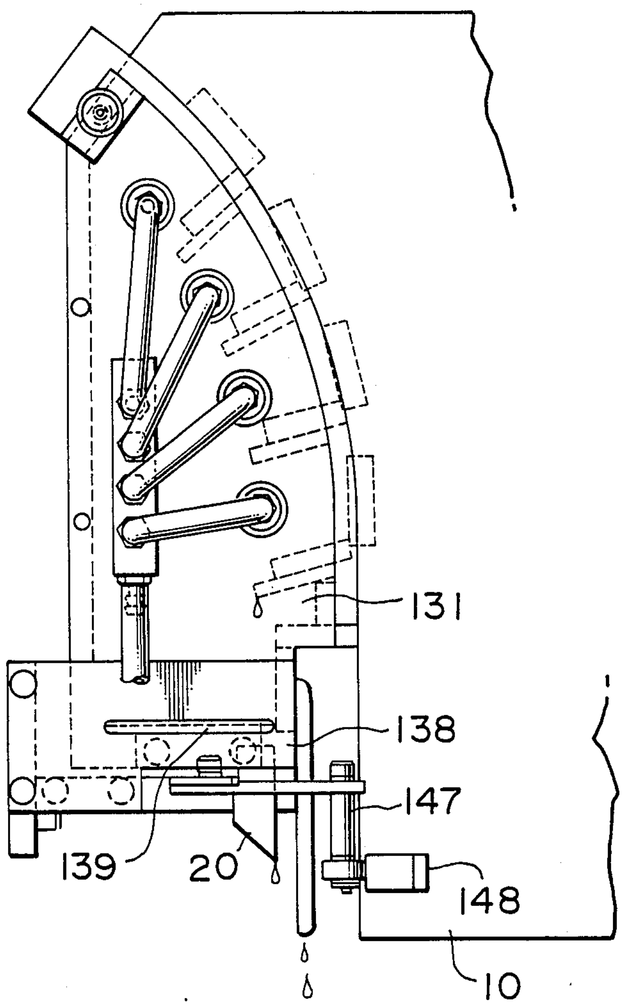
Figure 7C:
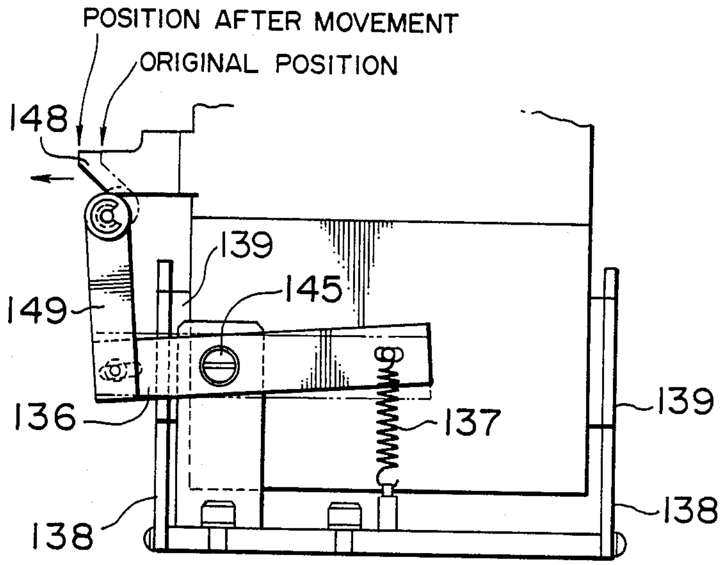

FIGS. 4 and 5 are, respectively, a front elevational view of an ink mist suction unit 30 and a fragmentary sectional view of a washing unit 13. Referring first to FIG. 4, a reference numeral 10 denotes an ink jet unit, 101 denotes an ink jet head, 30 denotes an ink mist suction unit, and 302 denotes a mist suction port. Characters l and L represent, respectively, the head mounting width and the width of the mist suction port.

Referring now to FIG. 5, a reference numeral 101 denotes an ink jet head, 131 denotes a washing housing, 132 denotes a washing nozzle, 133 denotes a draining member, 134 denotes a housing driving mechanism, and 225 denotes a mist condensate ink absorbing member.

The operation of this embodiment is as follows.

Referring first to FIG. 1, when the printer is not operating, the ink jet unit 10 is disposed at the home position 9 shown by a chain line, so that an anticlogging cap 11 covers the head nozzle so as to prevent clogging of the nozzle.

As the power is supplied to the apparatus, the anti-clogging cap is moved away from the head nozzle and pressurized air is supplied to the ink jet unit 10 so as to maintain a predetermined level of pressure in the ink jet unit 10. Then, after charging the drum 12 with a recording paper, a print start signal is applied so that the ink jet unit 10 is moved to the recording start position thereby starting the recording operation. Meanwhile, the air suction means 31 operates in synchronism with the picture signal, so that air is sucked through the suction air hose 32 from the ink mist suction unit 30 disposed in the vicinity of the ink jet unit 10. During the recording, the air suction means 31 continues to operate so that the generated ink mist is sucked by the ink mist suction unit 30.

FIG. 3 is a fragmentary sectional view of the ink mist suction unit 30. This unit 30 is disposed adjacent the upper portion of the ink jet unit 10. In order to facilitate maintenance, the ink mist suction unit 30 is detachable from the ink jet unit 10. Then, as the air suction means 31 operates, air containing ink mist is sucked through the mist suction port 302, so that the mist is trapped by a filter member 301 disposed in the ink mist suction unit 30.

The ink mist suction port 302 is disposed substantially flush with the head mounting surface 202 of the ink jet unit 10.

FIG. 4 is a front elevational view of the ink jet unit 10 and the ink mist suction unit 30, illustrating also the relationship between the width L of the ink mist suction port 302 and the head mounting width l, as well as the flow of air. As will be seen from this Figure, the width L of the ink mist suction port 302 is greater than the head mounting width l, and is substantially equal to the width of the ink jet unit 10. During the recording, the air is sucked by the mist suction port 302, through the gap of several millimeters formed between the ink jet unit 10 and the drum 12. The ink mist which is spread around the head is effectively trapped without being scattered, by virtue of the air which flows through the gap around the ink jet unit 10.

FIG. 5 is a fragmentary sectional view of the head cleaning unit 13. After the recording, the ink jet unit 10 and the ink mist suction unit 30 is stopped at a position in front of the head washing unit 13 which is located, as shown in FIG. 1, beyond one end of the drum 12. As the ink jet unit 10 stops to operate, the washing housing driving mechanism is started to operate to press the washing housing 131 to the ink jet unit 10. The housing driving mechanism 134, which is not described in detail, can have various designs. After the elapse of several seconds, the pump in the water supply tank 14 operates for a predetermined period of time (several seconds) so that the cleaning water is sprayed to the head 101 through the water supply pipe 16 and the washing nozzle 132, thereby washing away the condensate of the ink mist deposited on the head nozzle surface and therearound. Most part of the cleaning water sprayed to the ink jet head 101 flows into the washing housing 131 through the draining member 133 and is discharged into the drain receiver 17 through the drain passage 20, while other part of the water is discharged into the drain receiver 17 after washing the front surface of the ink jet unit 10. The drain accumulated in the drain receiver 17 is collected in the drain tank 19 of the printer, through the drain pipe 18 or discharged to an external tank or gutter.

The air suspending therein the ink mist impinges upon the mist suction port 302, so that a considerably large amount of mist attaches to the mist suction port 302. Usually, the ink contains a wetting agent so that the ink condensed as a result of evaporation of the water content exhibits a considerably high viscosity. When the ink has deposited too heavily, the ink naturally drops by the force of gravity, so as to attach to the recording paper or to contaminate devices. Therefore, in order to prevent deposition of the ink around the mist suction port 302, the mist ink absorber 225 attached to the washing housing 131 effectively absorbs the ink mist and the ink thus absorbed falls by the force of gravity into the washing housing 131, so as to be discharged together with the cleaning water.

After the completion of the washing, the washing housing driving device 134 operates so as to retract the washing housing 131, whereby the ink jet unit 10 and the ink mist suction unit 30 return to the home position 9.

The draining member 133 is intended for removing droplets from the underside of the head nozzle surface, thereby preventing these droplets from attaching to the recording paper or contaminating the drum 12. To this end, the draining member 133 is made of a hydrophilic foamed polymer with continuous pores, fiber mat or a brush-like member.

The mist ink absorber 225 is made of the same material as the draining member 133.

Thus, the second embodiment of the ink jet recording apparatus of the invention has an ink mist suction unit 30 disposed adjacent to the ink jet unit 10 and having a mist suction port of a width which is large enough to cover at least the head mounting region of the ink jet unit 10, and a water-spray type head washing unit 13 disposed so as to be confronted by the ink jet unit 10 and the ink mist suction unit 30 when they have been brought to a position beyond one end of the drum. The head washing unit removes the contaminants from the head nozzle surface upon each completion of the recording operation, thereby washing the head nozzle surface. At the same time, the mist ink absorber 225 provided on the head washing unit 13 effectively cleans the ink mist suction port 302, thereby ensuring stable operation of the ink jet head 101, while preventing the contamination of the devices and the recording medium by the ink mist. It is thus possible to obtain an ink jet recording apparatus which makes maintenance easy.

An explanation will be made hereinunder as to the method of driving of the washing housing 131.

Referring to FIGS. *6a* to *6d* , the ink jet recording apparatus has various parts such as an ink jet unit 10, an ink jet head 101, a knob 143, a hook 144, a housing 131, an outer wire 141, an inner wire 142, an L-shaped lever 136, a tension spring 137, a slide bearing 138, and a slider 139. Numerals 132 and 145 denote, respectively, a washing nozzle and a fulcrum.

The operation of this ink jet recording apparatus is as follows. The hook 144 is secured to a carriage carrying the ink jet unit 10, so as to be moved together with the ink jet unit 10. The ink jet unit starts from the home position 9 so as to record the desired information. During the recording, the washing unit 13 is pulled and retracted by the tension spring 137. As the ink jet unit 10 approaches the washing unit 13, the knob 143 is pushed by the hook 144 so that the inner wire 142 is pulled to transmit the force to the L-shaped lever 136. Since the L-shaped lever performs a lever action, the housing 131 is moved ahead in response to the movement of the inner wire 142 so as to approach the ink jet unit 10 into pressure contact with the latter.

The cleaning water is emitted in this state so as to wash the contaminates away from the ink jet head 101 and parts therearound. After the completion of the washing, the ink jet unit 10 is moved towards the home position 9, so that the washing housing 131 is returned by the tension coiled spring 137 away from the ink jet unit 10 so as to return to the initial position.

As will be understood from the foregoing description, in this embodiment of the invention, the washing housing can be moved back and forth simply by conversion of the force by the L-shaped lever 136, the force being transmitted from the ink jet unit carriage through the inner wire 142.

FIGS. *7a* to *7d* show a head washing device which constitutes an essential portion of a fourth embodiment of the ink jet washing device of the invention. More specifically, FIG. *7a* is a front elevational view, FIG. *7b* is a side elevational view and FIG. *7c* is a bottom plan view. In these Figures, a reference numeral 10 denotes an ink jet unit, 148 denotes an arm, 146 denotes a roller, 131 denotes a housing, 147 denotes a shaft, 149 denotes a connecting rod, 136 denotes a lever, 137 denotes a tension coiled spring, 138 denotes a slide bearing, and 139 denotes a slider. Numerals 132 and 145 denote, respectively, a washing nozzle and a fulcrum.

The operation of this embodiment is as follows.

The arm 148 is secured to the carriage carrying the ink jet unit 10, so as to move together with the latter. The ink jet unit 10 starts from the home position 9 so as to record the desired information. During the recording, the washing unit 13 is pulled and retracted by the tension coiled spring 137. As the ink jet unit 10 approaches the washing unit 13, the roller 146 abuts the arm 148 so as to be gradually pressed by the slope of the arm, so that the force transmitted from the connecting rod 149 is transmitted to the lever 136. Consequently, the housing 131 is pushed forwardly into pressure contact with the ink jet unit 10 by the lever action of the lever 136.

The cleaning water is discharged in this state so as to wash the ink jet head 101 and other parts therearound. After the washing, as the ink jet unit 10 moves towards the home position 9, the washing housing 131 is returned by the force of the tension coiled spring 137, whereby the ink jet unit 10 is moved away from the ink jet unit 10 towards the initial position.

As will be understood from the foregoing description, according to this embodiment, the washing housing 131 can be moved back and forth by making an efficient use of the force of the carriage carrying the ink jet unit, by virtue of the lever action which converts the force transmitted from the carriage through the connecting rod 149.

FIG. 8 shows an anti-clogging device which constitutes an essential feature of a fifth embodiment of the ink jet recording apparatus of the invention. In this embodiment, the anti-clogging device has an anti-clogging unit 11 which is provided with a wetting system which is adapted to supply water to the anti-clogging unit 11 from the water supply tank 14 through a water supply pipe **16*b***.

FIG. 9 is a fragmentary sectional view of the anti-clogging unit 11 mentioned above. In this Figure, a reference numeral 101 denotes an ink jet head, 151 denotes a wetting housing, 152 denotes a water supply nozzle, 153 denotes a rubber cap, 154 denotes a water retainer, 155 denotes a wetting liquid reservoir, and 156 denotes a wetting housing driving mechanism.

The operation of this embodiment will be described hereinunder.

When the printer is in the inoperative state as shown in FIG. 8, the ink jet unit 10 is disposed at the home position 9 so that the head nozzle is covered by the anti-clogging unit 11. Then, as the power supply is turned on, the anti-clogging unit 11 operates to uncover the ink jet unit 10, and pressurized air is supplied from an air source (not shown) to the ink jet unit 10 so as to maintain a predetermined level of air pressure in the ink jet unit 10. Subsequently, the recording drum 12 is charged with a recording paper, and the printing start signal is supplied to the recording start point, so that the recording is commenced. The ink jet unit 10 continues to move even after the completion of the recording, and is stopped at a position beyond one end of the recording drum 12, where the ink jet unit faces the head washing unit 13 disposed beyond the end of the drum. Then, as the ink jet unit 10 is stopped, the washing housing driving mechanism 134 shown in FIG. 2 operates so as to press the washing housing 131 against the ink jet unit 10. After the elapse of several seconds, a pump connected to the water supply tank 14 operates for a predetermined period of time, so that the cleaning water is sprayed onto the ink jet head 10 through the water supply pipe **16*a* and the washing nozzle 132**, thereby washing contaminants such as ink mist and paper dusts from the head nozzle surface and the parts therearound.

When running water is used as the cleaning water, the water supply tank 14 is not used and the rate of supply of the cleaning water is preferably conducted by a solenoid valve 15 which is disposed at an intermediate portion of the water supply pipe 16.

A part of the cleaning water is introduced into the water supply pipe **16*b* shown in FIG. 8 and is supplied to the wetting housing 151 through the water supply nozzle 152. The thus supplied water is poured onto the water retainer 154 filling the housing, so as to be retained by the retainer 154. The water which could not be retained by the water retainer flows downward by the force of gravity, so as to be collected in the wetting liquid reservoir 155** which is designed to maintain a constant water level therein.

More specifically, the wetting liquid reservoir 155 is sectioned into two chambers by a partition plate 156. These two chambers are communicated with each other through a passage 157 which is formed in the lower end of the partition plate 156. A drain pipe 158 projects into one of these chambers in such a manner as to maintain a constant liquid level. Namely, excessive water flows into this chamber through the passage 157 in the lower end of the partition plate 156 and overflows through the drain pipe 158 into a drain reservoir 17.

Thus, the supply of the cleaning water for washing the head and the supply of water to wetting housing are conducted upon each completion of the recording operation, so that the water in the wetting system is renewed each time the printing is completed. Therefore, there is no risk of shortage or exhaustion of water due to evaporation, however long the printing time may be and, hence, it is not necessary to pay attention to the wetting water or to provide a special circuit for detecting the amount of the wetting water. In addition, since the water is renewed after each printing operation, undesirable propagation of bacteria is avoided, thus enabling the anti-clogging unit to fully extend its merit.

Thereafter, as the supply of the electric power to the apparatus is ceased, the wetting housing driving mechanism 156 of the anti-clogging unit 11 starts to operate, so that the wetting housing 151 is moved forwardly, whereby a small wetting chamber filled with vapor provided by the water retainer 154 is formed between the rubber cap 153 and the mounting surface of the ink jet unit 10. Although the detail of the wetting housing driving mechanism 156 is not described, this mechanism can have various constructions and can be designed without difficulty. It will be understood that the evaporation of the ink solvent is suppressed and the clogging of the nozzle is prevented by placing the ink jet head 101 in this wetting chamber.

This embodiment has a problem in that air tends to be sucked into the head or the ink tends to be induced to the outside of the head undesirably due to a pressure change in the wetting housing which may be caused, for example, by a change in the ambient air temperature and by opening and closing of the cap. In order to solve this problem, this embodiment has an air vent hole 159 which provides a communication between the wetting chamber and the drain pipe 158 through the water retainer 154.

When the supply of the water is conducted from the water supply tank 14, it is advisable to add a small amount of surfactant and anti-bacteria agent to the water in the water supply tank 14, in order to further improve the reliability of operation of the cleaning device and the anti-clogging device.

As has been described, in this embodiment, a water-spray type cleaning unit 13 is disposed at a position beyond one end of the recording medium mounting surface, so as to be confronted by the ink jet unit 10 when the latter has been brought to this position upon each completion of the recording operation, whereby the contaminants such as ink deposited on the head nozzle surface is removed each time the printing is completed. This embodiment also has an anti-clogging unit 11 having a wetting housing which is adapted to be supplied with water each time the washing is conducted, so that the stability of the ink jet head is remarkably improved while clogging of the nozzle and contamination of the recording medium can be prevented for long period of time.

FIG. 10 is a plan view of an essential portion of a sixth embodiment of the ink jet recording apparatus of the invention.

Referring to this Figure, an ink jet unit 10 has an air nozzle which opens toward an ink nozzle from which tiny ink droplets are jetted in a manner controlled in accordance with an electric signal onto a recording paper which is wound on a recording drum 12. A head stabilizing unit 40 is adapted to prevent drying of the head in the ink jet unit 10 and to wash the head by water which is supplied thereto from a water supply tank 14. A reference numeral 15 denotes a solenoid valve, while 16 designates a water supply pipe through which the cleaning water is supplied from the water supply tank 14 into the head stabilizing unit 40. A drain receiver 17 is adapted for receiving the waste water or drain after the washing of the head. The drain is collected in a drain tank 19 through a drain tube 18 leading from the drain receiver 17.

FIG. 11 shows the detail of the head stabilizing unit 40 mentioned above. In this Figure, a reference numeral 101 denotes an ink jet head, 131 denotes a housing, 161 denotes a cap, 132 denotes a washing nozzle for washing the ink jet head, 162 denotes a water retainer, 163 denotes a housing driving mechanism, 164 denotes a fulcrum for the operation of the housing, 165 denotes a water reservoir, 166 denotes a partition plate, 167 denotes a water outlet passage, 168 denotes a vent hole and 169 denotes a drain pipe.

The operation of this embodiment will be described hereinunder.

As shown in FIG. 11, when the apparatus is not operating, the ink jet unit 10 is positioned at a position where it faces the head stabilizing unit 40 so that the nozzle of the head is isolated from the ambient air by the cap 161 of the head stabilizing unit. Then, as the electric power is turned on, the housing driving mechanism 163 of the head stabilizing unit 40 starts to operate to move the cap 161 away from the ink jet unit 10. Then, an air supplying device (not shown) is started so that pressurized air is supplied to the ink jet unit 10 so as to be maintained at a predetermined level in the latter. Subsequently, the recording paper is mounted on the recording drum 12 and the print start signal is applied so that the ink jet unit 10 commences the recording after it is moved to the recording start position.

The ink jet unit 10 continues to move even after the completion of the recording and is stopped when it has reached the position where it confronts the head stabilizing unit 40.

As the ink jet unit 10 is stopped, the housing driving mechanism 163 starts to operate in accordance with a sequence which has been programmed beforehand, so that the housing 131 is pressed against the ink jet unit 10 through the cap 161. Then, after the elapse of several seconds, the pump on the water supply tank 14 operates for a predetermined period of time, so that the cleaning water is sprayed onto the ink jet head 101 through the water supply pipe 16 and the washing nozzle 132, thereby washing contaminants such as ink and paper dusts away from the head nozzle surface and parts therearound. The cleaning water containing the ink dust then flows through the water retainer 162 charged in the housing 131 into the water reservoir 165.

When the water is supplied directly from running water supply, it is not necessary to use the water supply tank 14, and the rate of supply of the water can be controlled by a solenoid valve 15 which is disposed in an intermediate portion of the water supply pipe 16.

The water reservoir 165 is designed to maintain a constant water level therein. More specifically, the water reservoir 165 is sectioned by the partition plate 166 into two chambers which are communicated with each other through the passage 167 formed in the lower end of the partition plate 166. One of the liquid chambers has the drain pipe 169 which serves to maintain the constant water level. Namely, excessive water flows into this chamber through the passage 167 and overflows from the upper end of the drain pipe 169 into the drain reservoir 17, whereby the water level is maintained constant.

During the washing of the ink jet head 101, it is necessary to prevent any pressure rise in the housing 131 by the air and water which are discharged from the ink jet head 101 and the washing nozzle 132, respectively. To this end, the water retainer 162 is made of a material having a high permeability to water and a large water retaining capacity. An example of the material suitably used is a hydrophilic foamed polyvinylalcohol resin or cellulose having continuous pores. The pores in the water retainer 162 are communicated with a vent hole 168.

As will be understood from the foregoing description, in this embodiment of the invention, the head is washed upon each completion of the recording operation, so that the head is always maintained in good condition, while the water in the water reservoir 165 is renewed successively. Therefore, there is no risk of shortage or exhaustion of the water and it is not necessary to pay attention to the amount of water or to provide a specific circuit for detecting the amount of water. In addition, since the water is continuously renewed, the propagation of bacteria can be prevented advantageously.

When the operation of the apparatus is stopped, the ink jet unit 10 is returned in accordance with a previously programmed sequence to the position where it faces the head stabilizing unit 40, regardless of the position of the unit 10 at which the recording is completed. Then, the housing driving mechanism 163 operates to press the housing 131 towards the ink jet unit 10. The detail of the housing driving mechanism 163 is not described because it is the same as that described before in connection with FIG. 2.

The ink jet head 101 is isolated from the ambient air through the cap 161, and a small space 170 defined by the cap 161, water retainer 162 and the ink jet unit 10 is filled with vapor from the water retainer 162, whereby the ink in the nozzle is prevented from being dried by the wetting effect produced by the vapor.

As has been described, in this embodiment, a head stabilizing unit 40 which opens and closes in the direction of discharge of the ink is disposed at a position beyond one end of the recording medium mounting surface, so as to be confronted by the ink jet unit 10 when the latter has been brought to this position after completion of the printing operation. This head stabilizing unit 40 removes the contaminants on the head nozzle surface so as to maintain the head in good condition, while serving as an anti-clogging device during the suspension of operation of the recording apparatus, thereby assuring a high reliability of the recording apparatus as a whole.

What is claimed is:

1. An ink jet recording apparatus comprising:

an ink jet unit including an ink jet head adapted to selectively emit ink droplets under control of an electric signal applied to said ink jet unit, said ink jet head having an air nozzle and an ink nozzle, said air nozzle having an opening coaxial with an opening of said ink nozzle;

a recording medium mounting means for mounting a recording medium at a position opposite said ink jet unit;

a head washing unit, disposed at a position beyond one end of said recording medium mounting means, for washing said ink jet unit, said head washing unit being movable towards and away from said ink jet unit;

means for supplying a predetermined amount of cleaning liquid to said head washing unit when printing is finished;

means for draining soiled cleaning liquid away from said ink jet unit after a washing operation is completed;

a carriage said ink jet unit;

a guide shaft on which said carriage is slidably mounted such that said carriage is movable along said guide shaft; and means for removing droplets of said cleaning liquid from a surface of said ink jet head after printing is finished; and wherein said head washing unit includes a washing nozzle for spraying said cleaning liquid, a liquid receiving box slidable towards and away from the ink jet unit, and moving means for moving said liquid receiving box in response to movement of said carriage and said ink jet unit carried thereby.

* * * * *